(12) United States Patent
Sugiyama et al.

(10) Patent No.: US 12,145,184 B2
(45) Date of Patent: Nov. 19, 2024

(54) ROLLING LOAD PREDICTION METHOD, ROLLING LOAD PREDICTION DEVICE, AND ROLLING CONTROL METHOD

(71) Applicant: JFE STEEL CORPORATION, Tokyo (JP)

(72) Inventors: Tomohiko Sugiyama, Tokyo (JP); Kaoru Tanaka, Tokyo (JP); Kei Nishikawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 568 days.

(21) Appl. No.: 17/428,801

(22) PCT Filed: Feb. 19, 2020

(86) PCT No.: PCT/JP2020/006387
§ 371 (c)(1),
(2) Date: Aug. 5, 2021

(87) PCT Pub. No.: WO2020/171096
PCT Pub. Date: Aug. 27, 2020

(65) Prior Publication Data
US 2022/0126342 A1    Apr. 28, 2022

(30) Foreign Application Priority Data
Feb. 21, 2019    (JP) .................................. 2019-029123

(51) Int. Cl.
*B21B 38/00* (2006.01)
*B21B 37/58* (2006.01)
(Continued)

(52) U.S. Cl.
CPC ............ *B21B 37/58* (2013.01); *B21B 38/006* (2013.01); *B21C 51/005* (2013.01); *B21B 38/04* (2013.01)

(58) Field of Classification Search
CPC ....... B21B 37/58; B21B 38/006; B21B 38/04; B21B 38/00; B21B 2265/12; B21B 37/00;
(Continued)

(56) References Cited

U.S. PATENT DOCUMENTS

2002/0011089 A1    1/2002    Broese et al.
2004/0253561 A1    12/2004   Choi et al.
(Continued)

FOREIGN PATENT DOCUMENTS

CN    201032387 Y    3/2008
CN    105478490 A    4/2016
(Continued)

OTHER PUBLICATIONS

Mar. 20, 2023 Office Action issued in Korean Patent Application No. 10-2021-7024913.
(Continued)

*Primary Examiner* — Santosh R Poudel
(74) *Attorney, Agent, or Firm* — Oliff PLC

(57) ABSTRACT

A rolling load prediction method predicts a rolling load of a rolling mill for rolling steel and includes predicting the rolling load of the rolling mill in a case where the steel is rolled under an operating condition for prediction, by inputting the operating condition for prediction into a rolling load prediction model that has been trained with operation record data including at least a factor related to a temperature of the steel as an input variable and an actual value of the rolling load of the rolling mill as an output variable.

4 Claims, 3 Drawing Sheets

(51) Int. Cl.
*B21C 51/00* (2006.01)
*B21B 38/04* (2006.01)

(58) Field of Classification Search
CPC ........ B21C 51/005; B21C 51/00; G06N 3/08; G06N 5/01; G06N 3/04; G06N 20/00
See application file for complete search history.

(56) References Cited

U.S. PATENT DOCUMENTS

| | | | |
|---|---|---|---|
| 2010/0121471 | A1 | 5/2010 | Higo et al. |
| 2012/0004757 | A1* | 1/2012 | Imanari .................. B21B 37/74 700/104 |
| 2019/0236380 | A1 | 8/2019 | Fukuhara et al. |
| 2019/0361409 | A1* | 11/2019 | Bettinger ........... G05B 13/0265 |
| 2020/0133209 | A1* | 4/2020 | Kurz ....................... B21B 37/28 |

FOREIGN PATENT DOCUMENTS

| | | |
|---|---|---|
| CN | 106660090 A | 5/2017 |
| CN | 108363886 A | 8/2018 |
| DE | 199 30 124 A1 | 1/2001 |
| EP | 2 145 703 A1 | 1/2010 |
| EP | 3 006 126 A1 | 4/2016 |
| JP | H06-269823 A | 9/1994 |
| JP | H07-204718 A | 8/1995 |
| JP | H08-117827 A | 5/1996 |
| JP | H08-132114 A | 5/1996 |
| JP | H10-118701 A | 5/1998 |
| JP | 2763495 B2 | 6/1998 |
| JP | H11-707 A | 1/1999 |
| JP | 2005-528531 A | 9/2005 |
| JP | 2007245204 A * | 9/2007 |
| JP | 2013-226596 A | 11/2013 |
| JP | 2014-013560 A | 1/2014 |
| JP | 2017-199383 A | 11/2017 |
| JP | 2018-060512 A | 4/2018 |
| KR | 2003-0048932 A | 6/2003 |
| KR | 10-2009-0130410 A | 12/2009 |
| KR | 20150112095 A * | 10/2015 |

OTHER PUBLICATIONS

M. Bagheripoor et al.; "Application of artificial neural networks for the prediction of roll force and roll torque in hot strip rolling process"; Applied Mathematical Modelling; 2013; vol. 37; pp. 4593-4607.

Leven, J. et al., "An artificial neural network for rolling applications," Steel Times, Apr. 1995, vol. 223, No. 4, pp. 137-138.

Pichler, R. et al., "On-line optimisation of the rolling process—a case of neural networks," Steel Times, vol. 224, No. 9, pp. 310-311.

Mar. 4, 2022 extended Search Report issued in European Patent Application No. 20758445.9.

Nov. 18, 2022 Office Action issued in Chinese Patent Application No. 202080014930.6.

Jan. 30, 2023 Office Action issued in Korean Patent Application No. 10-2021-7024913.

Mar. 24, 2020 International Search Report issued in International Patent Application No. PCT/JP2020/006387.

May 30, 2023 Office Action issued in Chinese Patent Application No. 202080014930.6.

* cited by examiner

FIG.3

| OPERATION RECORD DB | | | |
|---|---|---|---|
| EXPLANATORY VARIABLE 1 | EXPLANATORY VARIABLE 2 | ............ | ROLLING LOAD |
| | | ............ | |
| | | ............ | |
| | | ............ | |
| | | ............ | |
| | | ............ | |

(a)

(b)

(c)

ROLLING LOAD PREDICTION METHOD, ROLLING LOAD PREDICTION DEVICE, AND ROLLING CONTROL METHOD

FIELD

The present invention relates to a rolling load prediction method, a rolling load prediction device, and a rolling control method.

BACKGROUND

Conventionally, in order to improve rolling quality and rolling efficiency, optimization has been performed on physical models used to calculate the setting values of rolling mills using operation record data, specifically, rolling load prediction models for predicting rolling loads. Specifically, Patent Literature 1 describes a technique that uses a neural network to train a mathematical model that formulates the characteristics of a rolling mill using operation record data.

CITATION LIST

Patent Literature

Patent Literature 1: Japanese Patent Application Laid-open No. H11-000707

SUMMARY

Technical Problem

However, because it is difficult to measure the temperature of steel during rolling, it has not been possible to optimize a rolling load prediction model using operation record data related to the temperature of steel. In addition, because the number of operation record data that can be used as training data items for neural networks is limited, the technique described in Patent Literature 1 does not use operation record data related to the temperature of steel as training data items. As a result, it has been difficult to predict rolling loads with high accuracy by using a rolling load prediction model so as to determine the setting values of a rolling mill with high accuracy, thereby making it difficult to improve the rolling quality and rolling efficiency of steel.

The present invention has been made in view of the above-described problems, and an object of the present invention is to provide a rolling load prediction method and a rolling load prediction device that can predict a rolling load of a rolling mill with high accuracy. Another object of the present invention is to provide a rolling control method that can improve the rolling quality and rolling efficiency of steel.

Solution to Problem

The inventors of the present invention have focused on the fact that input variables can be freely selected without considering the problem of multicollinearity when using a neural network, and examined various input variables. As a result, the inventors have found that the prediction accuracy of rolling loads is improved by adding the temperature of a skid rail and the like to the input variables, which is difficult to select with conventional methods. The inventors of the present invention have further investigated and found that the prediction accuracy of rolling loads is significantly improved by adding various factors related to temperature, including not only a direct factor of the temperature of steel at the time of rolling, but also indirect factors such as the temperature of the slab at the time of extraction from a heating furnace and the temperature of a skid rail, and reached the idea of associating the findings with a neural network, which has no limitation on the selection of input variables. Accordingly, the inventors have found that a rolling load of a rolling mill can be predicted with high accuracy by training a rolling load prediction model using a machine learning method with the input variables of the rolling load prediction model including factors related to the temperature of steel, and using the trained rolling load prediction model to predict the rolling load of the rolling mill. The present invention has been conceived on the basis of the above findings.

A rolling load prediction method according to the present invention is a rolling load prediction method for predicting a rolling load of a rolling mill for rolling steel, and includes a step of predicting the rolling load of the rolling mill in a case where the steel is rolled under an operating condition for prediction, by inputting the operating condition for prediction into a rolling load prediction model that has been trained with operation record data including at least a factor related to a temperature of the steel as an input variable and an actual value of the rolling load of the rolling mill as an output variable.

The factor related to the temperature of the steel may include a temperature of a skid rail that supports the steel in a heating furnace.

The rolling load prediction model may be a learning model that has been trained using deep learning.

A rolling load prediction device according to the present invention is a rolling load prediction device for predicting a rolling load of a rolling mill for rolling steel, and includes a unit configured to predict the rolling load of the rolling mill in a case where the steel is rolled under an operating condition for prediction, by inputting the operating condition for prediction into a rolling load prediction model that has been trained with operation record data including at least a factor related to a temperature of the steel as an input variable and an actual value of the rolling load of the rolling mill as an output variable.

The factor related to the temperature of the steel may include a temperature of a skid rail that supports the steel in a heating furnace.

The rolling load prediction model may be a learning model that has been trained using deep learning.

A rolling control method according to the present invention includes a step of calculating a setting value of a rolling mill using a rolling load of the rolling mill predicted using the rolling load prediction method according to the present invention, and controlling the rolling mill according to the calculated setting value.

Advantageous Effects of Invention

With a rolling load prediction method and a rolling load prediction device according to the present invention, a rolling load of a rolling mill can be predicted with high accuracy. In addition, a rolling control method according to the present invention can improve the rolling quality and rolling efficiency of steel.

BRIEF DESCRIPTION OF DRAWINGS

FIG. 3 is a schematic diagram illustrating a configuration of an operation record DB illustrated in FIG. 1.

DESCRIPTION OF EMBODIMENTS

The following describes a rolling control device according to an embodiment of the present invention with reference to the drawings.

Figure 1:
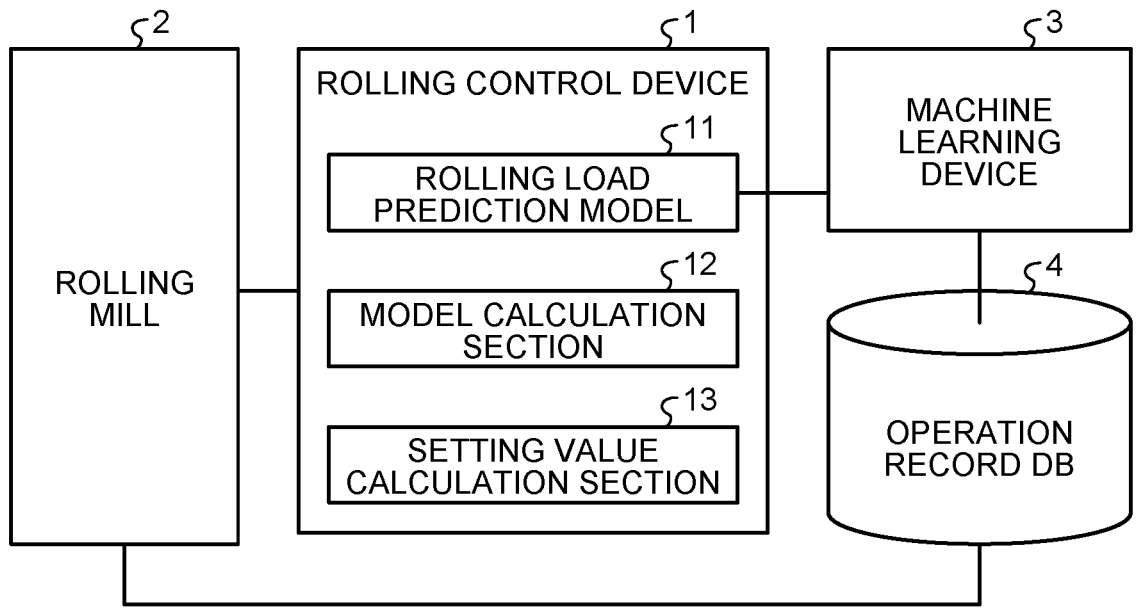
FIG. 1 is a block diagram illustrating a configuration of a rolling control device according to an embodiment of the present invention.
Figure 2:
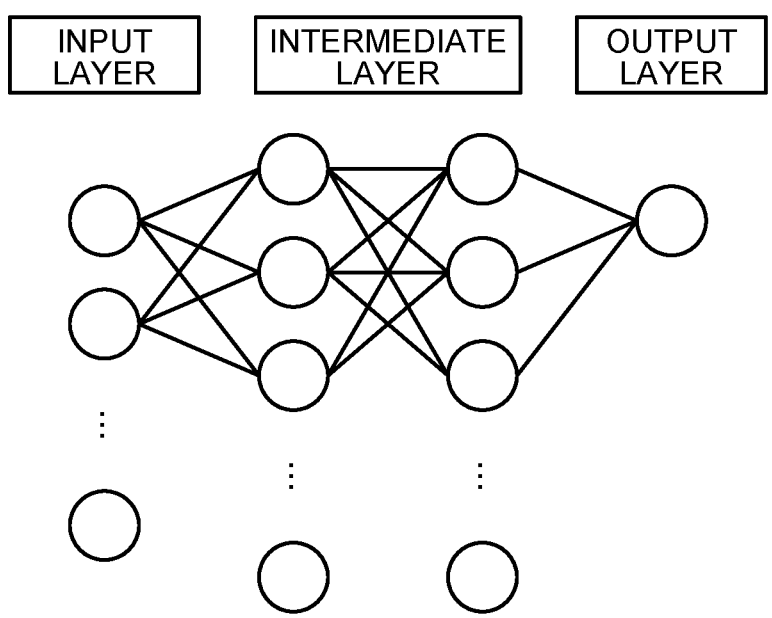
FIG. 2 is a schematic diagram illustrating a configuration of a rolling load prediction model illustrated in FIG. 1.

FIG. 1 is a block diagram illustrating a configuration of a rolling control device according to an embodiment of the present invention. FIG. 2 is a schematic diagram illustrating a configuration of a rolling load prediction model 11 illustrated in FIG. 1. FIG. 3 is a schematic diagram illustrating a configuration of an operation record DB4 illustrated in FIG. 1.

As illustrated in FIG. 1, a rolling control device 1 according to an embodiment of the present invention is configured with a well-known information processing device, and controls a rolling mill 2, such as a reversible rolling mill for manufacturing thick steel sheets, to control the rolling quality and rolling efficiency of steel rolled in the rolling mill 2.

The rolling control device 1 includes the rolling load prediction model 11, a model calculation section 12, and a setting value calculation section 13.

The rolling load prediction model 11 is a machine learning model for predicting a rolling load of the rolling mill 2 from operating conditions. In the present embodiment, the rolling load prediction model 11 is configured with a deep learning model including an input layer, a plurality of intermediate layers, and an output layer as illustrated in FIG. 2. Here, the input layer receives input of operating conditions for prediction for a rolling load. The parameters of the intermediate layers are machine-learned by a machine learning device 3. The output layer outputs the predicted value of the rolling load of the rolling mill 2 when steel is rolled under the operating conditions input in the input layer.

In the present embodiment, the input variables (explanatory variables) of the deep learning model include input variables related to the size of steel, input variables related to the temperature of the steel, input variables related to the constituent elements of the steel, and input variables related to the rolling mill 2 that rolls the steel.

Examples of input variables related to the size of steel may include the product dimensions of a steel sheet (thickness, width, length), the thickness of the sheet at the entry and exit sides of the rolling mill 2 at the time of rolling, and the dimensions of the slab extracted from a heating furnace (thickness, width, length).

Examples of input variables related to the temperature of the steel may include the temperature of the steel at the time of rolling (average value, temperature at the center in the width direction, temperature at an end in the width direction), the temperature of the slab at the time of extraction from the heating furnace (average value, temperature at the center in the width direction, temperature at an end in the width direction), and the temperatures of fixed and moving skid rails that support the steel in the heating furnace.

Examples of input variables related to the constituent elements of the steel may include constituent elements (C, Si, Mn, P, S, Cu, Ni, Cr, Mo, V, Nb, Al, Ti, B) and steel grade determination marks.

Examples of input variables related to the rolling mill 2 that rolls the steel may include the current number of rolling passes, the time between rolling, the radius of a work roll, the amounts of wear at the center and an end of the work roll in the width direction, and the number of rolling after changing work rolls. Among these input variables, the present invention adds input variables not used in conventional rolling load prediction, such as slab dimensions (thickness, width, length), product dimensions (thickness, width, length), the surface temperature of a slab at the time of slab extraction, the temperature of a fixed skid rail and the temperature of a moving skid rail in the heating furnace, composition information (C, Si, Mn, P, S), the number of rolling after changing rolling rolls, and the number of rolling passes. A rolling load is a combination of the deformation resistance of the steel sheet to be rolled and the pressure increment caused by friction on the contact line between a roll surface and a steel sheet surface. Among these, the deformation resistance varies greatly depending on the amount of pressure drop and the composition of the material, and also depends greatly on the temperature. Conventionally, the rolling load has been calculated using, as main input variables, the thickness of the sheet at the entry and exit sides of the rolling mill, the width of the sheet, the average temperature (predicted value) of the steel sheet at the time of rolling, the roll diameter, and other factors. However, in the present invention, the above-described input variables are newly added.

In particular, the deformation resistance is taken into account because it is affected by the material composition of the steel sheet (steel composition). As for the temperature, the calculation accuracy is thought to be improved when the effect of temperature unevenness in the thickness direction or the like is taken into account. The temperature unevenness in the thickness direction at the slab stage before rolling has a significant impact on the subsequent temperature prediction. Therefore, it has been decided that the temperatures of the fixed and moving skid rails in the heating furnace is considered to reflect the heating conditions in the heating furnace. The skid rails in the heating furnace are rod-shaped supports that support the slab in the furnace, and their interior is always water-cooled, which affects the temperature of the lower part of the slab, and thus its effect is evaluated using the temperatures of the skid rails. The number of rolling (the number of rolled materials) after changing rolling rolls are reflected in the input because it can be used for direct assessment of the degree of wear of the rolls. It is thought that this absorbs an increase in the error with respect to the contact arc length caused by roll flattening due to the use of rolls in rolling.

The machine learning device 3 obtains, as training data, pairs of input variables (explanatory variables) and actual rolling load values of the rolling mill 2 as illustrated in FIG. 3 from the operation record database (operation record DB) 4 that stores therein operation record data of the rolling mill 2, and performs machine-learning of the rolling load prediction model 11 using the obtained training data. In the present embodiment, deep learning is used as the machine learning method, but other machine learning methods such as logistic regression analysis, decision trees, and neural networks may also be used.

The model calculation section 12 predicts the rolling load of the rolling mill 2 when steel is rolled under the operating conditions for prediction by inputting the operating conditions for the prediction into the rolling load prediction model 11.

The setting value calculation section 13 calculates a setting value of the rolling mill 2 on the basis of the rolling load predicted by the model calculation section 12, and controls (sets up) the rolling mill 2 according to the calculated setting value.

EXAMPLES

Figure 4:
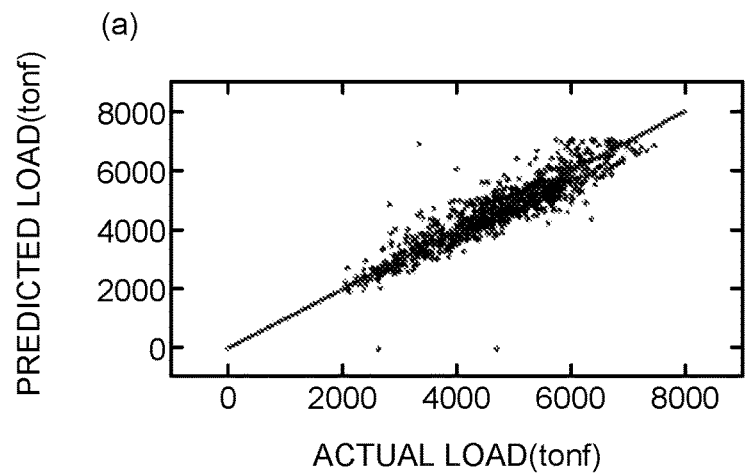
FIG. 4 are scatter diagrams illustrating the relations between the predicted loads and the actual loads in Example 1, Example 2, and Conventional Example.
Figure 4:
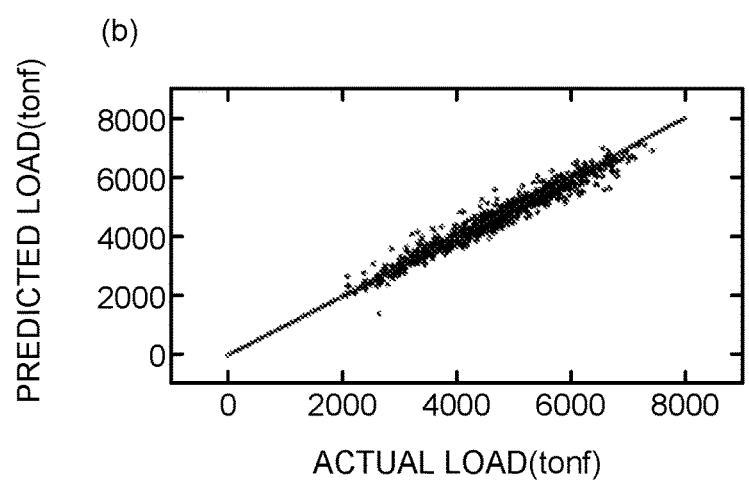
Figure 4:
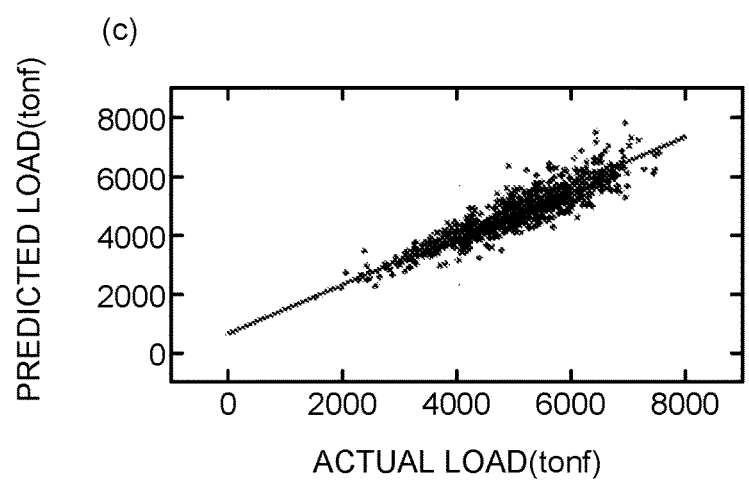

In the following examples, the machine learning of the rolling load prediction model 11 was performed using a publicly known deep learning framework, Chainer. Four intermediate layers (the number of units in each layer was set to 60, 120, 60, and 30, starting from the one closest to the input) were used, and operation record data of 200,000 operations was used as the training data. A batch normalization method (where the batch size was set to 256) was used during machine learning, and the Adam method was used to set the learning rate. A total of 35 input variables were used, which are the current number of passes, steel sheet dimensions (thickness, width, length), slab dimensions (thickness, width, length), constituent elements (C, Si, Mn, P, S, Cu, Ni, Cr, Mo, V, Nb, Al, Ti, B), steel grade designation marks (422, 434, 433, 333), temperature (temperature of steel at the time of rolling (average value, temperature at the center, temperature at an end), temperature of the slab at the time of extraction from a heating furnace (average value, temperature at the center, temperature at an end), temperature of fixed and moving skid rails in the heating furnace), time between rolling, a work roll (radius of the work roll, amounts of wear at the center and an end of the work roll, the number of rolling after changing work rolls). The actual value of a rolling load was used as the output variable (response variable). As a result, it was confirmed that the accuracy of the rolling load can be improved by performing machine learning of the rolling load prediction model 11 applied with the operation record data on temperatures and constituent elements. Table 1 presents a comparison between the accuracy of rolling load prediction and deformation resistance prediction using deep learning (Examples 1 and 2) and the accuracy of rolling load prediction using conventional physical model equations (Conventional Example). FIGS. 4(a) through 4(c) are scatter diagrams illustrating the relations between the predicted loads and the actual loads in Example 1, Example 2, and Conventional Example. The root mean square error (RMSE) of Example 1 is half of the RMSE of Conventional Example. Accordingly, it is confirmed that using deep learning can significantly improve accuracy.

TABLE 1

|  | Average | Standard Deviation | RMSE |
| --- | --- | --- | --- |
| Conventional Example | 0.15% | 10.8% | 10.8% |
| Example 1 | 0.41% | 5.38% | 5.40% |
| Example 2 | 1.62% | 8.90% | 9.05% |

As is clear from the above description, the rolling control device 1 according to an embodiment of the present invention predicts a rolling load of the rolling mill 2 when steel is rolled under an operating condition for prediction by inputting the operating condition for prediction into the rolling load prediction model 11 that has been trained with operation record data including at least a factor related to the temperature of steel as an input variable and the actual value of the rolling load of the rolling mill 2 as an output variable, and thus can predict the rolling load of the rolling mill 2 with high accuracy. This configuration also allows the setting value of the rolling mill 2 to be determined with high accuracy, thereby improving the rolling quality and rolling efficiency of steel.

Embodiments of the present invention made by the inventors have been described above; however, the present invention is not limited by the description and drawings that form part of the disclosure of the present invention by means of the embodiments. In other words, all other embodiments, examples, and operational techniques made by those skilled in the art or the like on the basis of the embodiments are included in the scope of the present invention.

INDUSTRIAL APPLICABILITY

According to the present invention, it is possible to provide a rolling load prediction method and a rolling load prediction device that can predict a rolling load of a rolling mill with high accuracy. The present invention also provides a rolling control method that can improve the rolling quality and rolling efficiency of steel.

REFERENCE SIGNS LIST

1 Rolling control device
2 Rolling mill
3 Machine learning device
4 Actual operation database (Actual operation DB)
11 Rolling load prediction model
12 Model calculation section
13 Setting value calculation section

The invention claimed is:

1. A rolling load prediction device for predicting a rolling load of a rolling mill for rolling steel, the device comprising:
circuitry configured to:
predict the rolling load of the rolling mill in a case where the steel is rolled under an operating condition for prediction, by inputting the operating condition for prediction into a rolling load prediction model that has been trained with operation record data including at least a factor related to a temperature of the steel as an input variable and an actual value of the rolling load of the rolling mill as an output variable;
calculate a setting value of the rolling mill using the predicted rolling load of the rolling mill; and
control the rolling mill according to the calculated setting value, wherein
the factor related to the temperature of the steel includes a temperature of a skid rail that supports the steel in a heating furnace.

2. The rolling load prediction device according to claim 1, wherein the rolling load prediction model is a learning model that has been trained using deep learning.

3. A rolling control method comprising:
calculating a setting value of a rolling mill using a rolling load of the rolling mill predicted using a rolling load prediction method; and
controlling the rolling mill according to the calculated setting value, wherein
the rolling load prediction method including
predicting the rolling load of the rolling mill in a case where the steel is rolled under an operating condition for prediction, by inputting the operating condition for prediction into a rolling load prediction model that has been trained with operation record data including at least a factor related to a temperature of the steel as an input variable and an actual value of the rolling load of the rolling mill as an output variable, and the factor related to the temperature of the steel includes a temperature of a skid rail that supports the steel in a heating furnace.

4. The rolling control method according to claim 3, wherein the rolling load prediction model is a learning model that has been trained using deep learning.

* * * * *